Oct. 4, 1949.  J. L. ANDERSON  2,483,719
GAS TORCH
Filed July 13, 1945
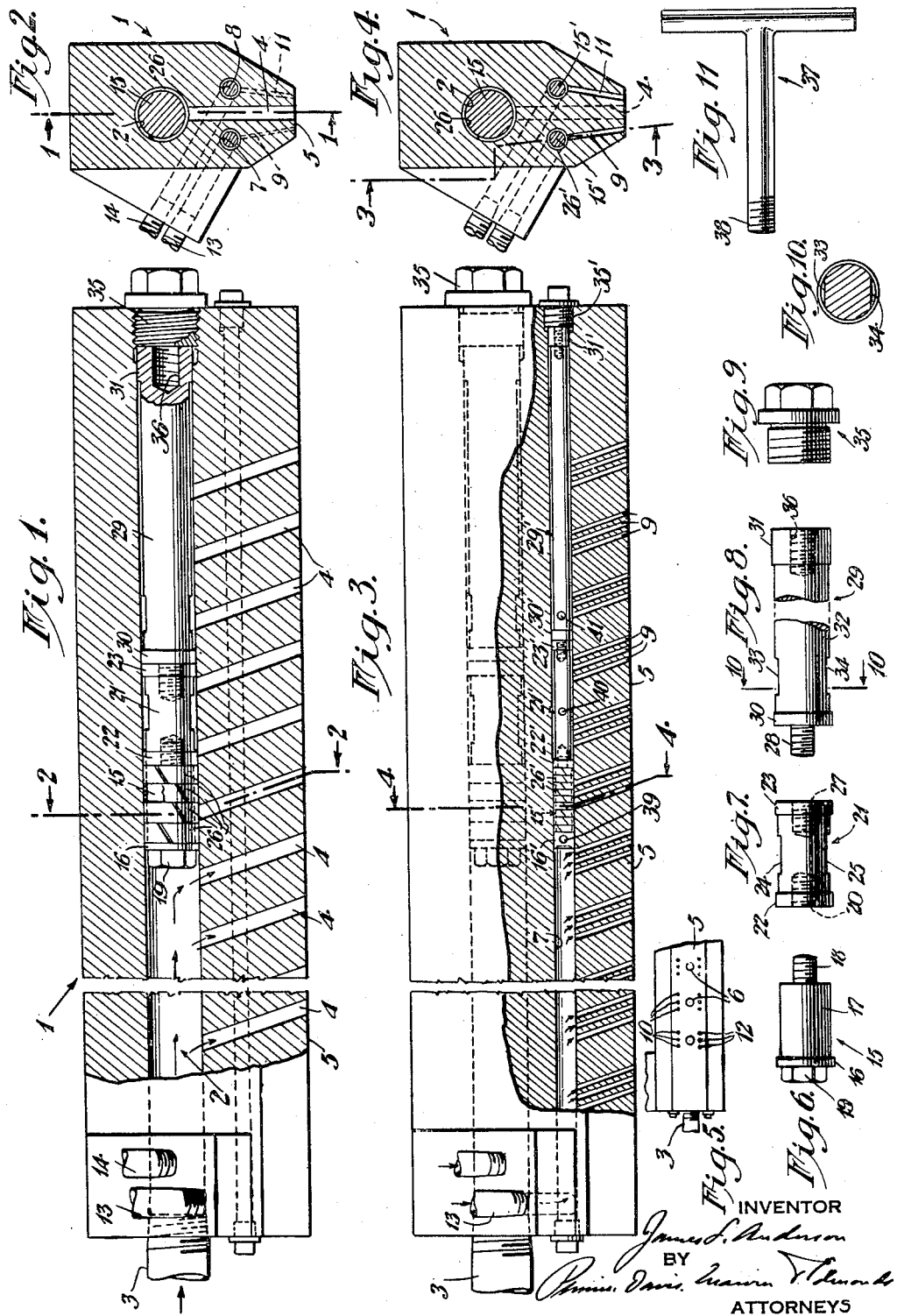
INVENTOR
James L. Anderson
BY
ATTORNEYS Patented Oct. 4, 1949

2,483,719

UNITED STATES PATENT OFFICE 2,483,719

GAS TORCH

James L. Anderson, Closter, N. J., assignor to Air Reduction Company, Incorporated, a corporation of New York Application July 13, 1945, Serial No. 604,737

2 Claims. (Cl. 158—27.4)

This invention relates to improvements in gas torches having a tip of the elongated block type in which a longitudinally extending row of jet passages is supplied with gas from a common longitudinally extending distributing chamber.

Torches of this type are used in scarfing, flame hardening and similar operations. Scarfing is performed on blooms, billets, slabs, or other metal work pieces, to remove a layer of the surface metal and thereby remove the surface imperfections before the final rolling operations. When a torch having a tip of the block type is used for this purpose the block tip has a longitudinally extending row of jet passages for projecting scarfing oxygen jets against the surface of the work while the metal is at kindling temperature to progressively remove the surface metal by thermo-chemical action when the block tip and the surface to be scarfed are moved relatively to each other in a direction at right angles to the row of oxygen jets. The block tip also has one or more longitudinally extending sets of jet passages for delivering a combustible mixture of oxygen and fuel-gas to preheating flames for heating the surface metal to kindling temperature. A longitudinal bore in the block tip with which all of the scarfing oxygen passages communicate serves as a gas distributing chamber for these passages, and each set of preheat passages communicates with a similar but smaller longitudinal bore or gas distributing chamber. When a torch having a tip of the block type is used for flame hardening and similar purposes there are, of course, no jet passages for scarfing oxygen but the block tip has at least one longitudinally extending set of jet passages for delivering a combustible gas mixture to the heating flames and a longitudinally extending distributing chamber communicating with all of them. As in scarfing, the block tip and the surface to be treated are moved relatively to each other in a direction at right angles to the longitudinally extending sets of flame jets.

The principal object of the invention is to make it possible when performing scarfing, flame hardening and similar operations, to use the same tip when operating on work pieces of different widths.

The invention will be described in connection with a torch tip intended for use in scarfing operations, and from such description it will be apparent how the invention can be applied to torch tips intended for other purposes, such as flame hardening and other heat-treating operations.

According to the invention the block tip is made long enough to operate on a work-piece of substantial width, and to adapt it for use on narrower work-pieces the effective length of each longitudinal bore or distributing chamber is reduced by inserting into it, from the end opposite to that at which the gas is admitted, a piston device that shuts off communication between the distributing chamber and those of its jet passages which are not needed in operating on the narrower work-piece.

A block tip intended for scarfing operations and embodying the invention is illustrated in the accompanying drawing, in which:

Figure 1 shows the block tip partly in plan, and partly in horizontal section taken through the distributing chamber for the scarfing oxygen passages approximately on the line 1—1 of Fig. 2;

Fig. 2 is a transverse section taken on the line 2—2 of Fig. 1;

Fig. 3 is a view similar to Fig. 1 but with the horizontal section taken through one of the distributing chambers for the preheat passages approximately on the line 3—3 of Fig. 4;

Fig. 4 is a transverse section taken on the line 4—4 of Fig. 3;

Fig. 5 is a front elevation, drawn to reduced scale, of a portion of the discharge face of the block tip and shows the arrangement of discharge orifices therein;

Figs. 6 to 8, inclusive, show in unassembled condition the parts of the piston device for the scarfing oxygen distributing chamber;

Fig. 9 is a detail view of the plug that closes the end of the scarfing oxygen distributing chamber after the piston device has been inserted therein;

Fig. 10 is a transverse section taken on the line 10—10 of Fig. 8; and

Fig. 11 is a detail view showing a tool that may be employed for removing the piston device when it is desired to replace it by one of a different length.

Referring first to Figs. 1 and 2, the tip shown therein comprises an elongated metal block 1 having a longitudinal bore 2 to one end of which (the left end as viewed in Fig. 1) scarfing oxygen may be admitted through an inlet pipe 3. The bore 2 communicates with the usual longitudinally extending row of jet passages 4 which lead to the discharge face 5 of the block (Fig. 2). The jet passages 4 have outlet openings 6 at the discharge face (Fig. 5).

The block also has two smaller longitudinal bores 7 and 8 (Fig. 2). The bore 7 communicates with a longitudinally extending row of preheat jet passages 9 terminating in discharge orifices 10 in the face of the tip (Fig. 5) and the bore 8 communicates with a similar longitudinally extending row of preheat jet passages 11 (Fig. 2) which terminate in discharge orifices 12 in the face of the tip (Fig. 5). There are three preheat jet orifices 10 above each scarfing jet orifice 6 and three preheat jet orifices 12 below each scarfing jet orifice. A combustible mixture of oxygen and fuel-gas, such as acetylene, is delivered to the longitudinal bores 7 and 8 by inlet pipes 13 and 14 at that end of the block tip at which the scarfing oxygen is admitted through the inlet pipe 3.

The larger bore 2 serves as a distributing chamber for distributing the scarfing oxygen to the jet passages 4, and the longitudinal bores 7 and 8 serve as distributing chambers for distributing the combustible gas mixture to the jet passages 9 and 11 for feeding the usual preheating flames.

When it is desired to adapt the block tip for use on an area or work-piece of less width than the maximum width for which the tip is designed, a piston device is inserted in the longitudinal bore 2 from its right end as viewed in Fig. 1. The piston device, in addition to the piston rings hereinafter referred to, is made up of three main parts shown separately in Figs. 6, 7 and 8. These parts comprise a piston 15 (Fig. 6), a connector member 21 (Fig. 7) and a piston rod 29 (Fig. 8).

At the left end of the piston 15 there is a portion 16 (Fig. 6) the diameter of which is only slightly less than the internal diameter of the bore 2 and to the right of this portion there is a portion 17 of reduced diameter. At the right end of the piston there is a threaded stud 18 and at the piston's left end there is a hexagonal head 19. The stud 18 screws into a threaded socket 20 in the left end of the connector member 21 (Fig. 7). This member has end portions 22 and 23 the diameter of which is substantially the same as the diameter of the portion 16 on the piston 15. The intermediate portion of the connector member 21 is of reduced diameter, as shown, and has diametrically opposite flat surfaces 24 and 25 milled or otherwise formed thereon by means of which the connector member may be gripped with a wrench while the piston 15 is connected to it or disconnected from it by a wrench applied to the hexagonal head 19. Before the member 21 is connected to the piston 15 a number of piston rings shown at 26 in Fig. 1 are slipped on the reduced-diameter portion 17 of the piston, and when the member 21 and piston 15 are connected together the piston rings are confined between the two shoulders formed by the maximum-diameter portion 16 on the piston and the maximum-diameter portion 22 on the connector member 21, as shown in Fig. 1.

The right end of the connector member 21 has a threaded socket 27 (Fig. 7) to receive a threaded stud 28 on the left end of the piston rod 29 (Fig. 8).

The piston rod may be similar in construction to the connector member 21, having end portions 30 and 31, the diameter of which is substantially the same as the diameter of the portions 16, 22 and 23 on the piston and connector members, and an intermediate portion 32 of reduced diameter. Diametrically opposite flat surfaces 33 and 34 may be milled or otherwise formed on the intermediate portion 32 by means of which the piston rod may be gripped with a wrench when connecting it to or disconnecting it from the connector member 21.

The right end of the distributing chamber 2 for the scarfing oxygen is closed by threaded plug 35, as shown in Fig. 1. This plug is shown by itself in Fig. 9. When a piston device made up as hereinbefore described is inserted in the distributing chamber 2, the right end of the piston rod 29 abuts against the plug 35.

When the width of the surface to be scarfed is such that it is desired to use all of the jet passages 4 to project oxygen jets against the work surface throughout the length of the block tip, no piston device is used in the distributing chamber 2, and in that event the distributing chamber supplies oxygen to all of the jet passages. When it is desired to reduce the effective length of the block tip, as when scarfing narrower work-pieces or narrower areas, a piston device of the kind above described is inserted into the distributing chamber 2 from its right end, the length of the piston rod 29 being so chosen that the piston will shut off communication between the distributing chamber 2 and all those jet passages near the right end of the block tip which it is not desired to use. In Fig. 1 the piston rod 29 is of such length that the piston blocks the distributing chamber at a point such that the six jet passages at the right end of the block tip will receive no gas. While all of the unobstructed jet passages do not appear in Fig. 1, in the particular torch illustrated therein there would be about six of such unobstructed passages at the left end of the block tip. After the piston device has been inserted in the distributing chamber 2 the plug 35 is screwed in place to close the end of the distributing chamber and to move the piston to its final extreme position toward the left.

To facilitate removing the piston device the right end of the piston rod 29 has a threaded socket 36. After the plug 35 is removed, a tool 37 of the kind shown in Fig. 11 and having a threaded end 38 adapted to be screwed into the socket 36, may be employed to withdraw the piston device from the distributing chamber.

For each block tip there is a set of piston rods 29 of different lengths. If the jet passages 4 are spaced about an inch apart the piston rods of the set would differ in length in steps of one inch. By using piston rods of different lengths any desired number of the jet passages at the right end of the block tip may be shut off. Ordinarily, the longest piston rod would not shut off more than about half of the total number of jet passages at the right end of the block tip since the block tip would probably never be used for scarfing areas of less width than that which would necessitate the use of half of the number of jet passages at the left end of the block tip.

When a piston device of the kind described is inserted in the distributing chamber 2 for the scarfing oxygen a similar piston device of substantially the same length is preferably inserted in each of the distributing chambers 7 and 8 so that none of the preheat jet passages associated with the inactive scarfing jet passages will receive any gas. Fig. 3 shows a piston device inserted in the distributing chamber 7 for the preheat passages 9. It may be constructed in the same way as the piston device already described except that the parts are of smaller diameter, and due to the relatively small diameter of the parts they are preferably provided with transverse holes 39, 40 and 41, respectively, in lieu of the flat wrench-engaging surfaces and hexagonal head 19 on the piston device previously described. These transverse holes are adapted to receive pins to facilitate screwing the parts together and disconnecting them. The parts of the smaller piston device shown in Fig. 3 are designated by reference numerals which are the same as those used to designate corresponding parts of the larger piston device shown in Fig. 1 but with prime marks applied to them.

It will now be clear that a piston device of the kind described may also be used in connection with a block tip designed for flame hardening metal surfaces or otherwise heat-treating them. Such a block tip would, of course, have no row of jet passages for scarfing oxygen and consequently no scarfing oxygen distributing chamber, but it would have one or more longitudinally extending sets of passages for feeding a combustible gas mixture to heating flames and each such set of jet passages would have a distributing chamber similar to that shown at 7 and 8 in the drawing. A piston device of the kind herein described and of proper diameter could be inserted in each of such distributing chambers to shut off the desired number of jet passages at one end of the block when it is desired to use the block tip for heating work-pieces or areas of less width than the maximum width for which the block tip is designed.

I claim:

1. A gas torch having a tip of the elongated block type provided with a longitudinal gas distributing chamber and a longitudinally extending set of jet passages leading from the distributing chamber to the discharge face of the tip, means for supplying gas to the distributing chamber at one end thereof, a piston device adapted to be inserted into the distributing chamber from its opposite end, said piston device including a piston and a detachable piston rod, the piston device being insertable wholly within said distributing chamber, and a member detachably connected to the tip at the end of the distributing chamber and constituting an abutment for the outer end of the piston rod, said piston rod being of a predetermined length whereby when the piston device is inserted into the distributing chamber with the outer end of the piston rod in engagement with said detachable member the piston device extends a predetermined distance into the distributing chamber to shut off communication between the distributing chamber and a predetermined number of the jet passages at the corresponding end of the tip and whereby the piston rod may be disconnected from the piston and replaced by a piston rod of a different length so that the piston device will then shut off communication between the distributing chamber and a different predetermined number of said jet passages.

2. A gas torch having a tip of the elongated block type provided with a longitudinal gas distributing chamber and a longitudinally extending set of jet passages leading from the distributing chamber to the discharge face of the tip, means for supplying gas to the distributing chamber at one end thereof, a piston device adapted to be inserted into the distributing chamber from its opposite end, said piston device including a piston and a detachable piston rod, the piston device being insertable wholly within said distributing chamber, a plug adapted to be screwed into the end of said distributing chamber and constituting an abutment for the outer end of the piston rod, said piston rod being of a predetermined length whereby when the piston device is inserted into the distributing chamber with the outer end of the piston rod in engagement with said detachable member the piston device extends a predetermined distance into the distributing chamber to shut off communication between the distributing chamber and a predetermined number of the jet passages at the corresponding end of the tip and whereby the piston rod may be disconnected from the piston and replaced by a piston rod of a different length so that the piston device will then shut off communication between the distributing chamber and a different predetermined number of said jet passages.

JAMES L. ANDERSON.

REFERENCES CITED

The following references are of record in the file of this patent:

UNITED STATES PATENTS

| Number | Name | Date |
| --- | --- | --- |
| 2,128,552 | Rader, et al. | Aug. 30, 1938 |
| 2,199,951 | Gorman | May 7, 1940 |
| 2,228,114 | Hess | Jan. 7, 1941 |
| 2,370,371 | Pratt, et al. | Feb. 27, 1945 |